(12) United States Patent
Hung

(10) Patent No.: US 6,439,591 B1
(45) Date of Patent: Aug. 27, 2002

(54) BICYCLE

(76) Inventor: George Hon-Cheung Hung, Merry Terrace, Block K, 1$^{st}$ Fl. 4 Seymour Road, Hong Kong (HK)

( * ) Notice: Subject to any disclaimer, the term of this patent is extended or adjusted under 35 U.S.C. 154(b) by 0 days.

(21) Appl. No.: 09/486,722

(22) PCT Filed: Sep. 8, 1998

(86) PCT No.: PCT/GB98/02699

§ 371 (c)(1),
(2), (4) Date: May 8, 2000

(87) PCT Pub. No.: WO99/12803

PCT Pub. Date: Mar. 18, 1999

(30) Foreign Application Priority Data

Sep. 8, 1997 (GB) .............................................. 9719037

(51) Int. Cl.$^7$ ................................................ B62M 1/20
(52) U.S. Cl. .................... 280/226.1; 280/227; 280/230; 280/223
(58) Field of Search ................................ 280/259, 260, 280/261, 220, 221, 223, 226.1, 227, 230, 252, 253, 256, 281.1

(56) References Cited

U.S. PATENT DOCUMENTS 4,266,794 A * 5/1981 Bals ............................ 280/227
4,371,185 A * 2/1983 Bals ............................ 280/227
4,561,668 A * 12/1985 Klopfenstein ............. 280/226.1
5,636,854 A * 6/1997 Hung ........................ 280/226.1

FOREIGN PATENT DOCUMENTS

| CH | 248369 | 2/1948 |
| DE | 3137317 A1 | 4/1983 |
| FR | 392051 | 11/1908 |
| GB | 126539 | 5/1919 |
| GB | 457307 | 11/1936 |
| GB | 2111924 A | 7/1983 |

* cited by examiner

Primary Examiner—J. J. Swann
Assistant Examiner—F. Zeender
(74) Attorney, Agent, or Firm—Jacobson Holman, PLLC

(57) ABSTRACT

A bicycle which can be driven either by conventional rotation of the pedals, or by reciprocating movement of the saddle on the seat post. The cycle includes two frame portions: a first fixed frame portion including an upright member extending from a drive wheel axle bearing, and a second movable frame portion including the seat post which has bifurcated arms driving transmission levers for turning the drive wheel.

6 Claims, 5 Drawing Sheets

BICYCLE

FIELD OF THE INVENTION

BACKGROUND OF THE INVENTION

This invention relates to a bicycle, and in particular to a bicycle in which forward movement may be generated not only by conventional rotation of the pedals, but also or alternatively by means of vertical reciprocal movement of the saddle.

In a conventional bicycle, a drive wheel is adapted to be driven in rotation by means of a gear wheel, an endless driving chain and a driving gear wheel. The driving gear wheel is rotatable by means of two cranks having pedals rotatably mounted thereon, the two cranks being mounted in opposition to one another. In use a user may sit on a saddle of the bicycle and apply a force first to one pedal and then to the other and effect rotation of the two cranks and thus of the driving gear wheel.

In my earlier patent application GB 2111924A there is described a bicycle wherein rotation of the drive wheel can be effected by the application of a force alternately to a pedal and to the saddle. The bicycle comprises a saddle mounted on a crossbar, and a force transmission member for transmitting a force from the cross bar to the pedal cranks. FIG. 1 is a perspective view of this arrangement in which saddle 1 is mounted at one end of crossbar 2, and force transmission member 3 is fixed to the crossbar 2 at a point substantially half way along its length.

As can be seen from FIG. 1 the triangular frame 4 of the bicycle is a double frame comprising pairs of spaced parallel elements. The force transmission member 3 is located between these frame elements, and in particular between the two paired elements 5 comprising the upper side of the frame triangle and two paired elements 6 forming the rearmost side of the triangle.

This double frame arrangement has a number of disadvantages. As can be seen from FIG. 1 there is no seat post. In a conventional bicycle fitted with derailleur gears a part of the gear mechanism is fitted to the seat post. The absence of a seat post in the arrangement of GB 2111924A makes the use of such gearing harder and more difficult and the number of gears available to a rider is substantially limited. A further disadvantage is that the bottom of the force transmission member 3 must be fitted to a one-piece crank 7. Since this crank is formed as a one-piece structure as a practical manufacturing question is not possible to provide an adequate bearing between the crank 7 and the force transmission member 3. A further disadvantage of this arrangement is the added manufacturing complexity and cost that is involved because it is difficult to adapt simply an existing bicycle production line to the manufacture of such double-framed bicycles. The cycle requires a large number of specially designed parts and components and does not make maximum use of the various standard cycle components that are available. Inevitably this increases cost further.

SUMMARY OF THE INVENTION

According to the present invention there is provided a cycle comprising, a pair of crank means, a drive wheel rotatable in response to rotation of the crank means, a pair of pedals for effecting rotation of respective crank means, and a seat post on which a saddle is mounted at one end, said seat post being connected to two transmission levers arranged respectively on either side of a cycle frame, whereby said cycle may be propelled either by rotation of said pedals or by a reciprocating movement of said seat post.

This arrangement overcomes or at least mitigates the aforementioned disadvantages. A seat post is provided to facilitate the provision of a greater number of gears. The transmission levers may extend vertically as far as the saddle itself and may even be connected directly thereto, in a preferred embodiment however the seat post is provided with a bifurcated lower portion forming two arms that are connected to the two transmission levers. This connection of the bifurcated arms of the seat post to the transmission levers is such that proper bearings may be provided, and the overall manufacturing complexity and costs are reduced.

In a particularly preferred arrangement the cycle frame comprises an upright member extending from the drive wheel axle, and a gear adjusting mechanism may be provided on the upright member adjacent the drive wheel. The cycle frame may still further comprise a rear wheel support member a part of which extends from the upright member to a steering post, and may further comprise a crossbar extending from the seat post and rotatably mounted to the steering post, and a bifurcated pair of reinforcing arms extending from an end of the crossbar adjacent the steering post no lower ends of the bifurcated arms of the seat post.

Viewed from another aspect the present invention provides a cycle comprising, a pair of crank means, a drive wheel rotatable in response to rotation of the crank means, a pair of pedals for effecting rotation of respective crank means, and a pair or handlebars on a steering post, wherein said cycle further comprises a first fixed frame portion including an upright member extending from the axle bearing of said drive wheel and a rear wheel support member extending between an upper end of said upright member and said steering post, and a second movable frame portion comprising a seat post connected to a pair of transmission levers and a crossbar extending from an upper part of said seat post to said steering post and being rotatably mounted thereto, said first frame portion being received within said second frame portion.

The first frame portion may further comprise a bar extending from said axle bearing to said steering post to form a triangle with said upright member and said rear wheel support member, and said second frame portion may further comprise a bifurcated reinforcing bar extending from said crossbar to lower ends of said bifurcated seat post arms.

BRIEF DESCRIPTION OF THE DRAWINGS

An embodiment of the invention will now be described by way of example and with reference to the accompanying drawings, in which.

DETAILED DESCRIPTION OF THE PREFERRED EMBODIMENTS

Figure 1:
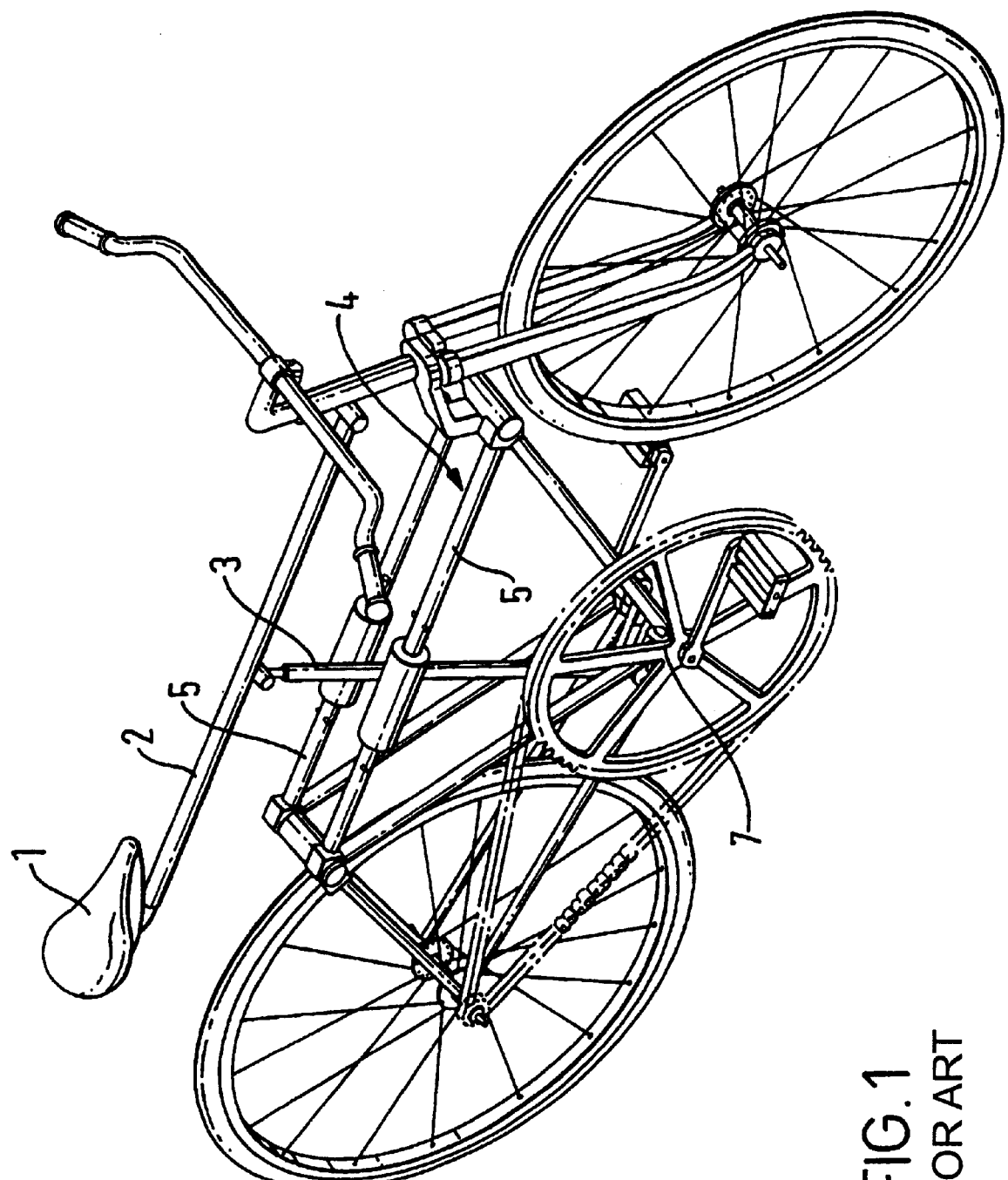
FIG. 1 is a perspective view of a bicycle according to the prior art.
Figure 2:
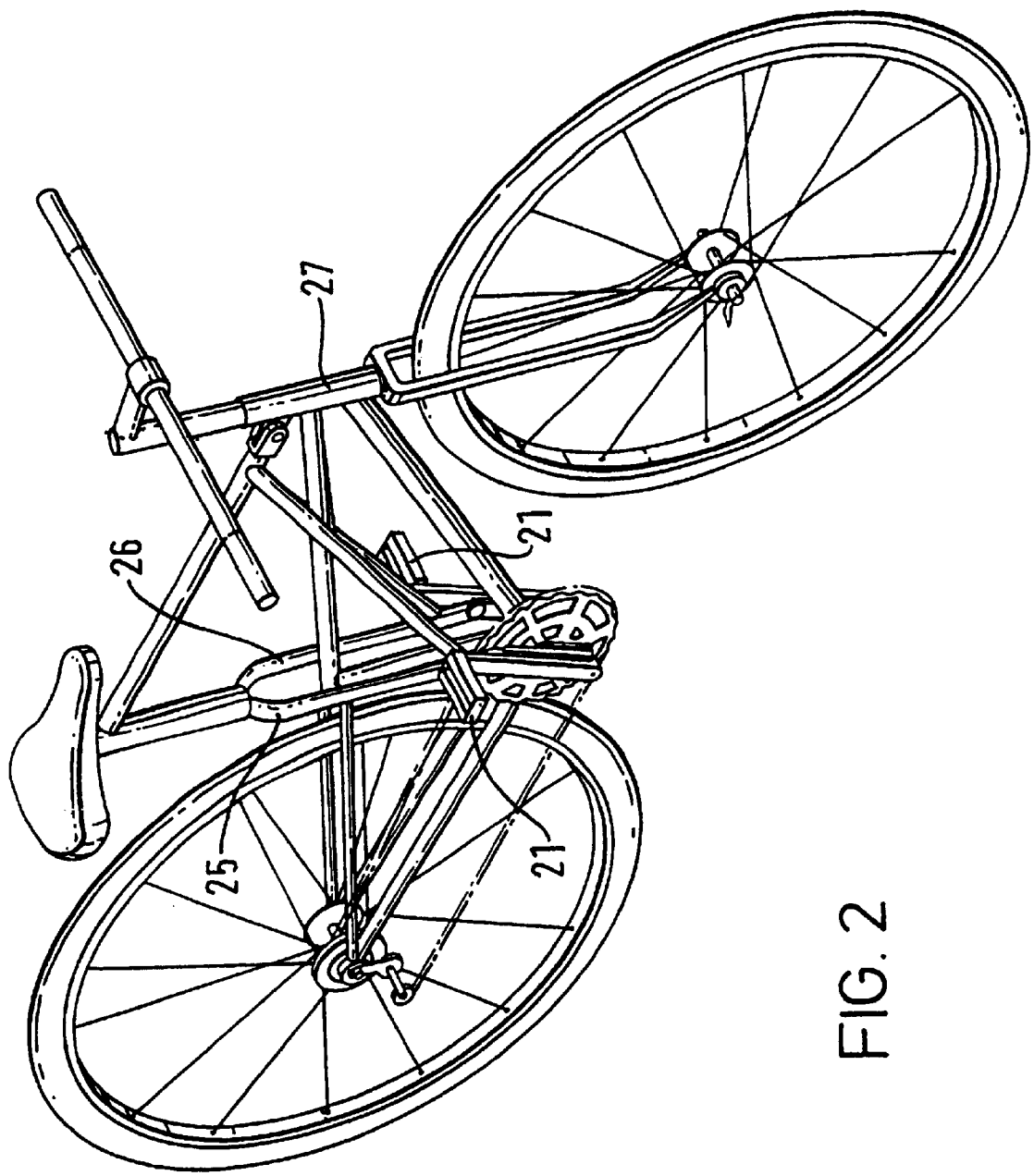
FIG. 2 is a perspective view of a bicycle according to an embodiment of the invention with the pedals in a top dead centre position.
Figure 3:
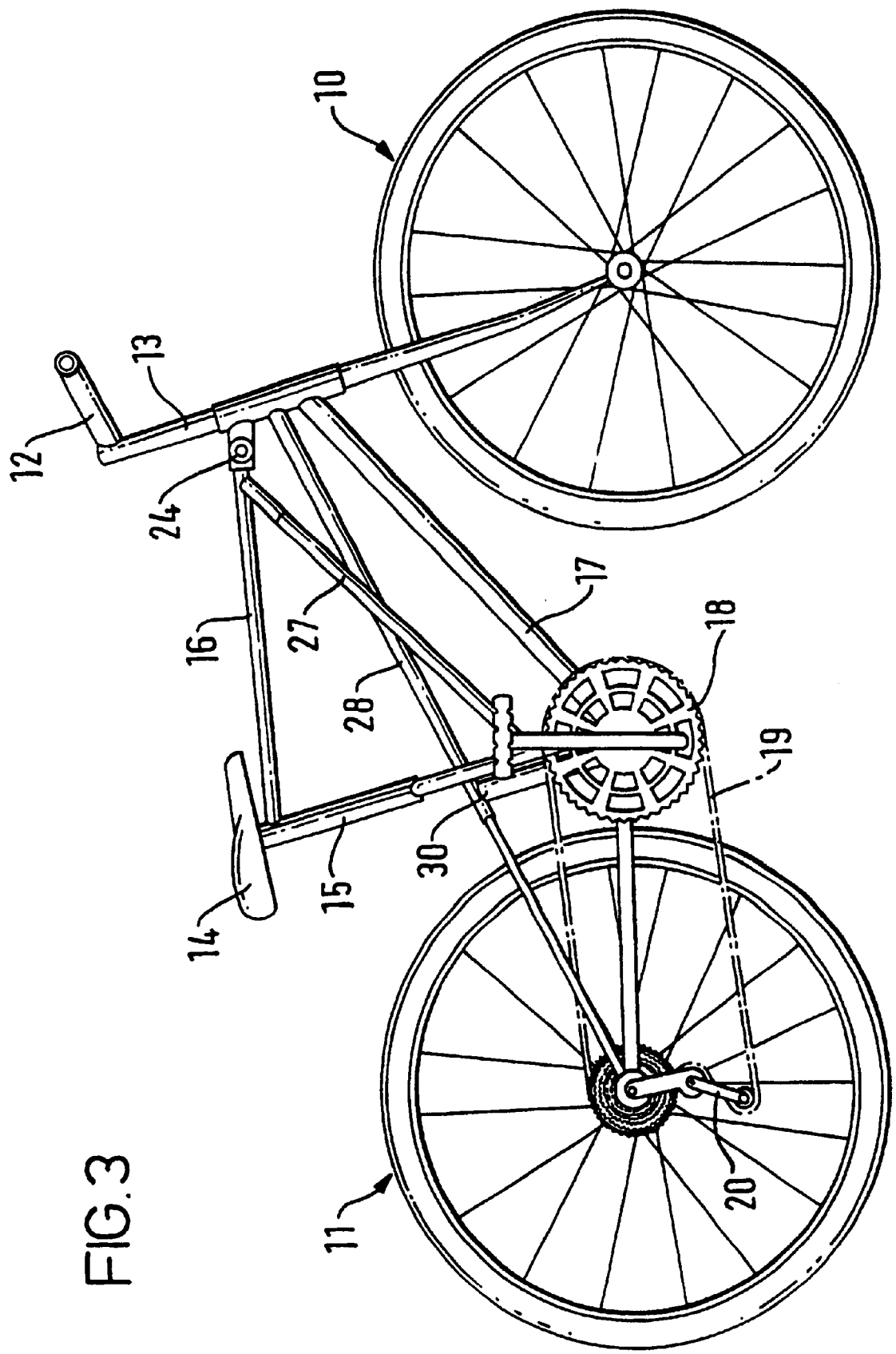
FIG. 3 is a side view of the bicycle of FIG. 2.

Referring firstly to FIGS. 2 & 3 there is shown a bicycle having front 10 and rear 11 wheels, handlebars 12 provided at the top end of a steering post 13, and a saddle 14 provided at the top end of seat post 15. The seat post 15 forms one part of a triangular frame together with crossbar 16 and bar 17. At the lowermost point of the frame there is further provided a toothed drive wheel 18 which is fitted with a drive chain 19 which drives the rear wheel 11 through a corresponding gear mechanism 20 provided on the axle of the rear wheel 11 in a conventional manner.

Figure 4:
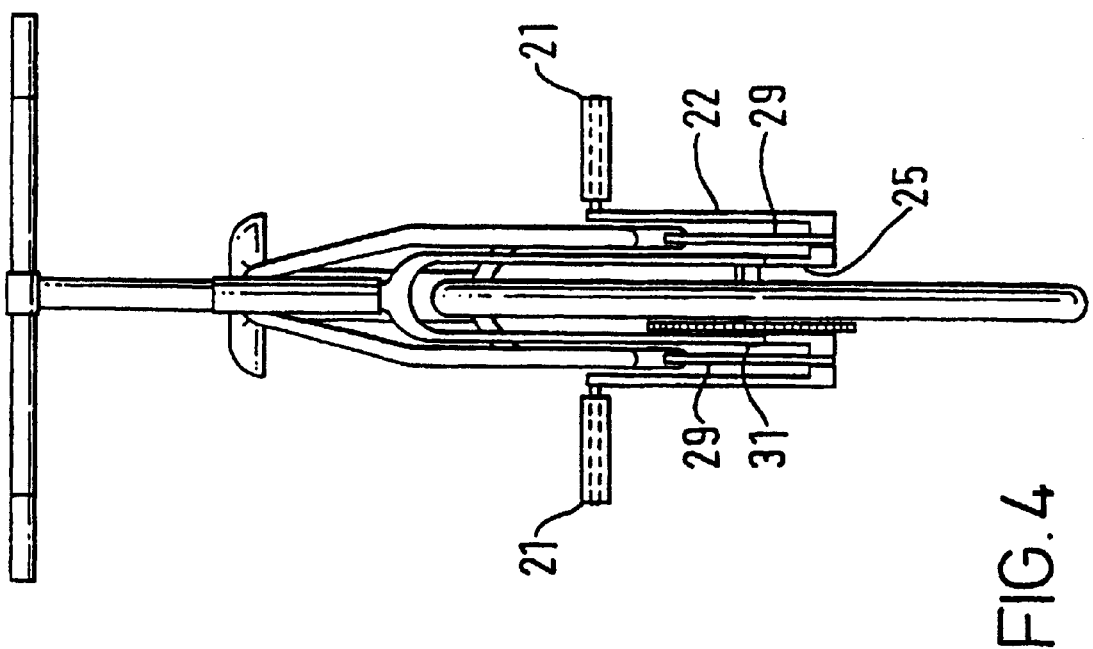
FIG. 4 is a front view of the bicycle of FIG. 2, showing the pedal cranks in section.

As can be best seen in FIGS. 2 & 4 located on either side of the bicycle frame are provided pedals 21 which upon their rotation by a rider are adapted to cause the drive wheel 18 in rotation through crank arms 22,23 each pedal 21 being provided with respective crank arms. It will be observed that unlike a conventional bicycle where the pedals are 180° out of phase with each other—the two pedals are in phase, ie in the position shown in FIG. 2, 3 & 4 they are both in their top dead centre positions at the same time.

Crossbar 16 is connected to a point close to the top of the steering post 13 in a rotatable manner with a bearing 24. Similarly it will be noted that the lower half of the seat post 15 is bifurcated so as to form two forked arms 25,26 on respective sides of the bar 17 and the lowermost ends of the arms 25,26 are rotably connected to the ends of transmission levers 29. However, instead of providing downwardly extending bifurcated arms 25,26, transmission levers 29 may be extended vertically even as far as just beneath the saddle, or the connection between the arms of the seat post and the transmission levers 29 may be at any convenience location. Also provided is a bifurcated second reinforcing bar 27 the forked ends of which are connected to the arms 25,26 of the seat post at points adjacent their ends, and the other end of which connects to the crossbar 16 at a point adjacent its rotable mounting to the sneering post 13. Located between the forked arms of both is second reinforcing bar 27 and the forked arms 25,26 of the seat post is a rear wheel support 28 which in turn is forked so as to support the rear wheel 11. A strengthening bar 35 is also provided extending from the drive wheel axle bearing 31 to the steering post.

With this arrangement the bicycle may be propelled both by rotation of the pedals and by a reciprocating substantially vertical movement of the saddle. In the position shown in FIGS. 2, 3 & 4 the pedals are at their top dead centre position about to begin a downward stroke. At the same time the saddle is at its lowest position (ie its bottom dead centre position). As the pedals are pressed down to cause the drive wheel to rotate and thus the rear wheel to turn, crank arms 22, 23 move from the position shown in FIGS. 2, 3 & 4 to the position of FIGS. 5 & 6.

Figure 6:
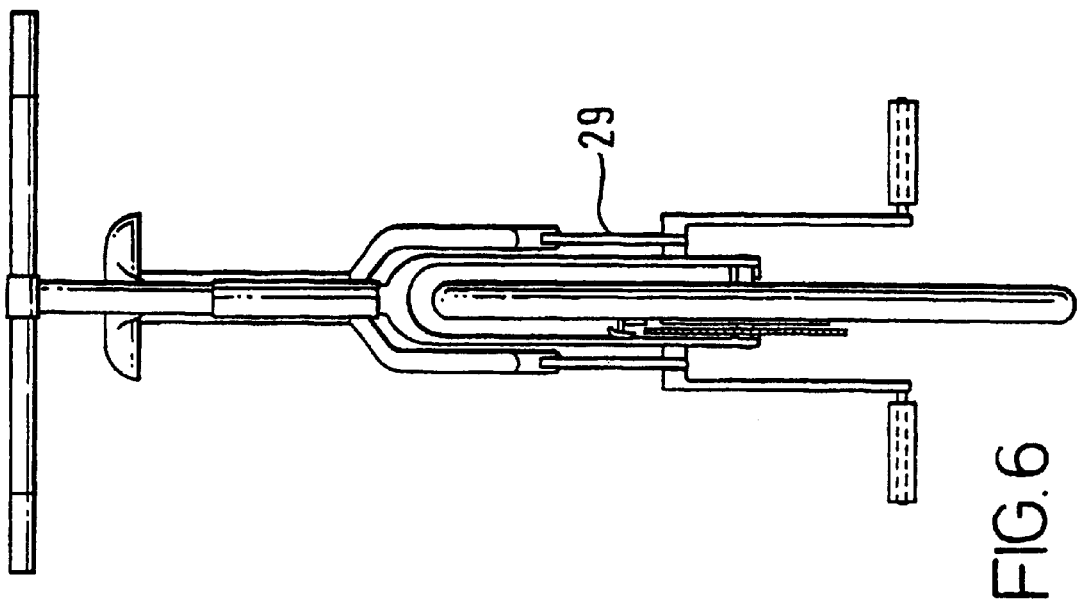
FIG. 6 is a view corresponding to FIG. 4 but with the pedals in the position shown in FIG. 5.
Figure 5:
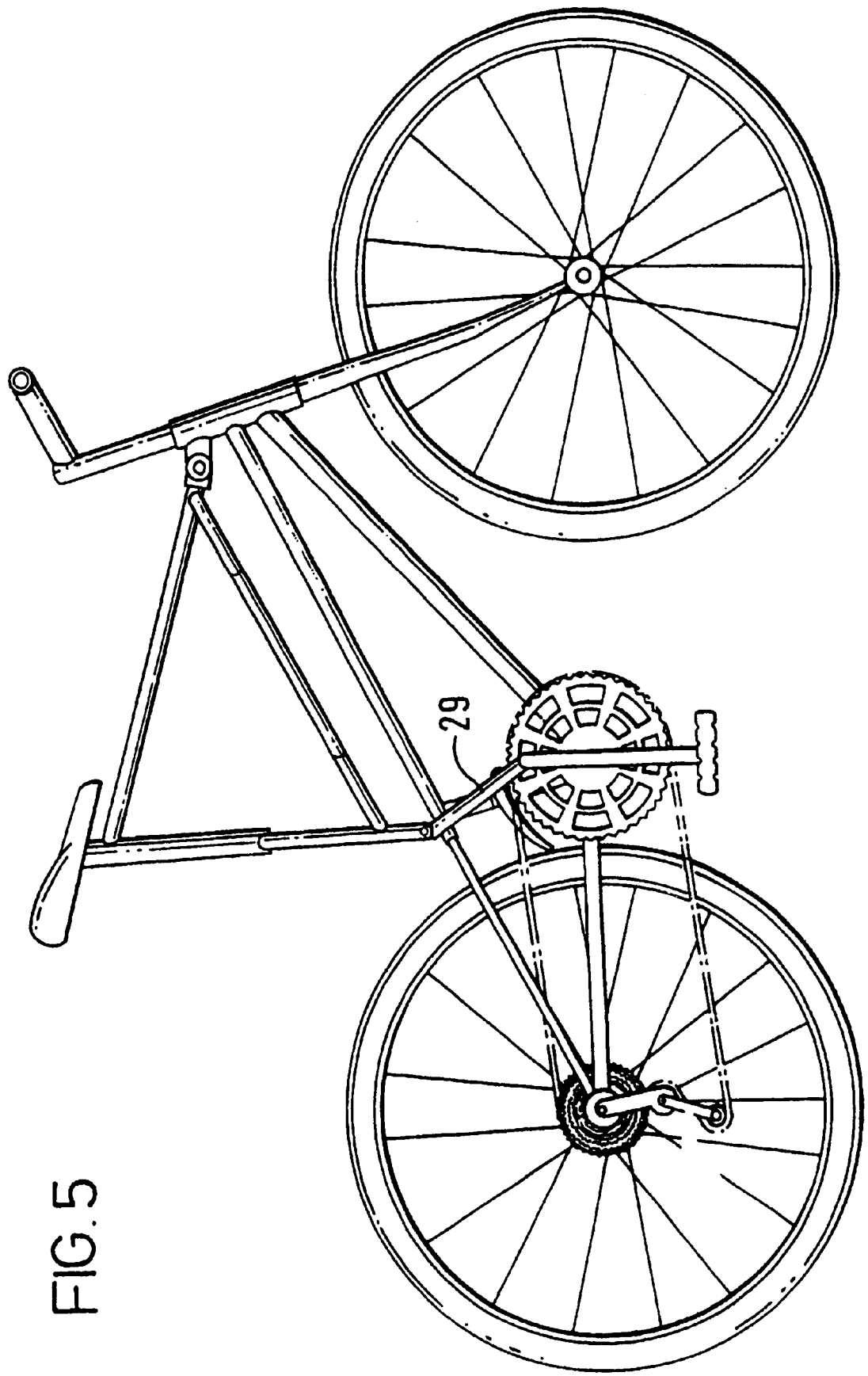
FIG. 5 is a view corresponding to FIG. 2 but showing the pedals in a bottom dead centre position.

In the position of FIGS. 5 & 6 the pedals are at their bottom dead centre position and the saddle is at its top dead centre position and continued rotation of the drive wheel is effected by downward movement of the saddle under the weight of a rider which downward movement acts upon the drive wheel through transmission levers 29 until the position of FIGS. 2 to 4 is reached again when the sequence begins afresh. Thus in this manner the cycle may be propelled forwardly by alternating application of force both through the pedals in a conventional manner and also through the saddle and the saddle post. Such an arrangement provides both an alternative form of exercise for a rider and simply the fun and amusement of a different form of propulsion.

Referring in particular to FIGS. 2 & 3 it will be seen that an upright reinforcing bar 30 is provided extending between the drive wheel axle bearing 31 and the rear wheel support 28. Mounted on this upright bar is a gear control mechanism 32 (see FIG. 6) for controlling the operation of a derailleur gear in a conventional manner. On a conventional bicycle this equivalent mechanism is provided on the seat post but in the bicycle of GB 2111924A this is not possible because the seat post is not fixed and because of the double frame structure and therefore the number of possible gears is reduced. With the arrangement of the present invention this problem is mitigated and by fixing the mechanism to the upright bar 30 increased gearing is possible.

Another way of viewing the cycle frame is as one comprising two generally triangular frame portions. A first fixed frame portion comprising upright bar 31, strengthening bar 35 and rear wheel support member 28, and a second movable frame portion comprising seat post 15,25,26, crossbar 16 and bifurcated reinforcing bar 27, with the first frame portion received within the bifurcated arms of the second frame portion.

Furthermore means may be provided whereby this "exercise" configuration of the cycle may be converted into a conventional cycle configuration. This may be achieved by making bifurcated arms 25,26 removable and replaceable with a seat post extension that would connect the seat post 15 with the upright reinforcing bar 30. All that would then be required to change the cycle into a conventional configuration would be to change one of the pedals so that the two pedals are exactly out of phase with each other.

What is claimed is:

1. A cycle comprising:

a front wheel and a rear wheel, a pair of crank arms each having two ends, a drive wheel having an axle connected to said crank arms for driving said rear wheel and said drive wheel being rotatable in response to rotation of the crank arms, a pair of pedals located at one end of each of said crank arms, wherein each pedal effects a same rotation of a respective crank arm, a seat post on which a saddle is mounted at an upper end, said seat post being bifurcated into two arms, each of said seat post arms being connected to a respective transmission lever arranged respectively on either side of a cycle frame, said transmission levers being rotatably connected to the drive wheel through the other end of said crank arms other than at a center of the drive wheel such that the drive wheel rotates in response to movement of the transmission levers, a steering post, a crossbar extending from said seat post, said crossbar being rotatably connected to said steering post, and a bifurcated pair of reinforcing arms extending from an end of said crossbar adjacent said steering post to lower ends of said bifurcated arms of said seat post, whereby said cycle is propelled by rotation of said pedals and by a reciprocating movement of said seat post operating out of phase with respect to each other by 180°.

2. A cycle as claimed in claim 1, wherein said cycle frame comprises an upright member extending from the axle of said drive wheel.

3. A cycle as claimed in claim 2, wherein a gear adjusting mechanism is provided on the upright member adjacent said drive wheel.

4. A cycle as claimed in claim 2, wherein said cycle frame further comprises a rear wheel support member, a part of which extends from the upright member to a steering post.

5. A cycle comprising a front wheel and a rear wheel, a pair of crank arms each having two ends, a drive wheel having an axle connected to said crank arms for driving said rear wheel and said drive wheel being rotatable in response to rotation of the crank arms, a pair of pedals located at one end of each of said crank arms wherein each pedal effects a same rotation of a respective crank arm, and a pair of handlebars on a steering post, wherein said cycle further comprises a first fixed frame portion including an upright member extending from the axle of said drive wheel and a rear wheel support member connecting an upper end of said upright member and said steering post, and a second movable frame portion movable with respect to the first fixed frame portion comprising as seat post bifurcated into two arms, each of said seat post arms being connected to a respective transmission lever and said transmission levers being rotatably connected to the drive wheel through the other end of said crank arms other than at a center of the drive wheel, and a crossbar extending from an upper part of said seat post to said steering post and being rotatably mounted thereto, a bifurcated pair of reinforcing arms extending from an end of said crossbar adjacent said steering post to lower ends of said bifurcated arms of said seat post, said transmission levers being rotatably connected to the drive wheel by said crank arms such that the drive wheel rotates in response to movement of the transmission levers and at least a portion of said first frame portion being received within said second frame portion.

6. A cycle as claimed in claim 5, wherein said first frame portion further comprise a bar extending from said axle bearing to said steering post to form a triangle with said upright member and said rear wheel support member.

* * * * *